(12) United States Patent
Pigott et al.

(10) Patent No.: US 7,707,339 B2
(45) Date of Patent: Apr. 27, 2010

(54) DATA ARBITRATION ON A BUS TO DETERMINE AN EXTREME VALUE

(75) Inventors: John M. Pigott, Phoenix, AZ (US); Michael Jennings, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 65 days.

(21) Appl. No.: 11/959,250

(22) Filed: Dec. 18, 2007

(65) Prior Publication Data

US 2009/0157929 A1    Jun. 18, 2009

(51) Int. Cl.
*G06F 13/368* (2006.01)

(52) U.S. Cl. .................................. 710/110; 710/123

(58) Field of Classification Search .................. 710/110, 710/123
See application file for complete search history.

(56) References Cited

U.S. PATENT DOCUMENTS

| | | | | | |
|---|---|---|---|---|---|
| 4,488,218 | A | * | 12/1984 | Grimes | 710/116 |
| 4,511,969 | A | * | 4/1985 | Koenig et al. | 379/90.01 |
| 4,779,089 | A | * | 10/1988 | Theus | 710/244 |
| 4,796,025 | A | * | 1/1989 | Farley et al. | 340/3.51 |
| 5,101,482 | A | * | 3/1992 | Kipnis | 710/118 |
| 5,128,936 | A | * | 7/1992 | van Steenbrugge et al. | 370/462 |
| 5,140,586 | A | * | 8/1992 | Kloper et al. | 370/216 |
| 5,163,048 | A | * | 11/1992 | Heutink | 370/402 |
| 5,263,163 | A | * | 11/1993 | Holt et al. | 710/242 |
| 5,526,496 | A | * | 6/1996 | Alnuweiri | 710/125 |
| 2004/0199730 | A1 | * | 10/2004 | Eggers et al. | 711/154 |

OTHER PUBLICATIONS

Phillips Semiconductors, "The I2C-Bus Specification," version 2.1, Jan. 2000, document order No. 9398 393 40011, 46 pages.
Bosch, "CAN Specification," version 2.0, Sep. 2001, 73 pages.
SBS Implementers Forum, "System Management Bus (SMBus) Specification," version 2.0, Aug. 3, 2000, 59 pages.

* cited by examiner

*Primary Examiner*—Paul R Myers

(57) ABSTRACT

A system includes a master device and a plurality of slave devices. The master device initiates a bus transaction having an arbitration data field for processing by a subset of the slave devices. Each slave device of the subset arbitrates a corresponding data value for the arbitration data field via the multiple-access bus such that an extreme data value of the data values of the slave devices of the subset is transmitted via the multiple-access bus for the arbitration data field. The slave device can arbitrate its data value by providing the data value for serial transmission via a data line of the multiple-access bus and monitoring the data line. In response to determining that a bit value of the data value being provided does not match the state of the data line, the slave device terminates provision of the data value, thereby ceasing arbitration of its data value.

20 Claims, 7 Drawing Sheets

DATA ARBITRATION ON A BUS TO DETERMINE AN EXTREME VALUE

FIELD OF THE DISCLOSURE

The present disclosure relates generally to communication buses and more particularly to data arbitration via communication buses.

BACKGROUND

Certain systems employ multiple devices to monitor conditions or to obtain data for a particular data class (e.g., a temperature value at each device). It often may prove desirable to determine the extreme value (i.e., maximum value or minimum value) of the data class for the multiple devices. In conventional systems whereby the devices are coupled together via a communications bus, a master device individually polls each device via the bus to determine its corresponding data value, and the extreme value from the multiple devices is then determined at the master device from the collection of the polled data values. Thus, N bus transactions typically are needed to individually poll N devices to determine the extreme data value of the corresponding data class of the N devices. The number of bus transactions thus needed to determine the extreme value can undesirably impede efficient operation of the system and increase power consumption. Accordingly, an improved technique for determining an extreme value for a data class represented by multiple devices of a system would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As used herein, a "multiple-access bus" refers to a serial bus having a data line with either a wired-AND configuration (e.g., for active-high logic) or a wired-OR configuration (e.g., for active-low logic) for devices attached thereto. The connections of the devices to the multiple-access bus can be achieved via, for example, an open-drain configuration (for a field effect transistor (FET)-based implementation) or an open-collector configuration (for a bipolar junction transistor (BJT)-based implementation). The multiple-access bus can be substantially compatible with any of a variety of bus protocols, including, but not limited to, an Inter-Integrated Circuit (I2C) protocol, a System Management Bus (SMBus) protocol, a Controller Area Network (CAN) protocol, a proprietary protocol, or combinations thereof. For ease of description, the techniques of the present disclosure are illustrated in the example context of a two-wire bus substantially compliant with the I2C protocol having a single master device and multiple slave devices, where the designation of a device as a "master" device or a "slave" device may be specific to a particular bus transaction. However, these techniques can be implemented in other serial bus architectures using the guidelines provided herein without departing from the scope of the present disclosure.

Figure 1:
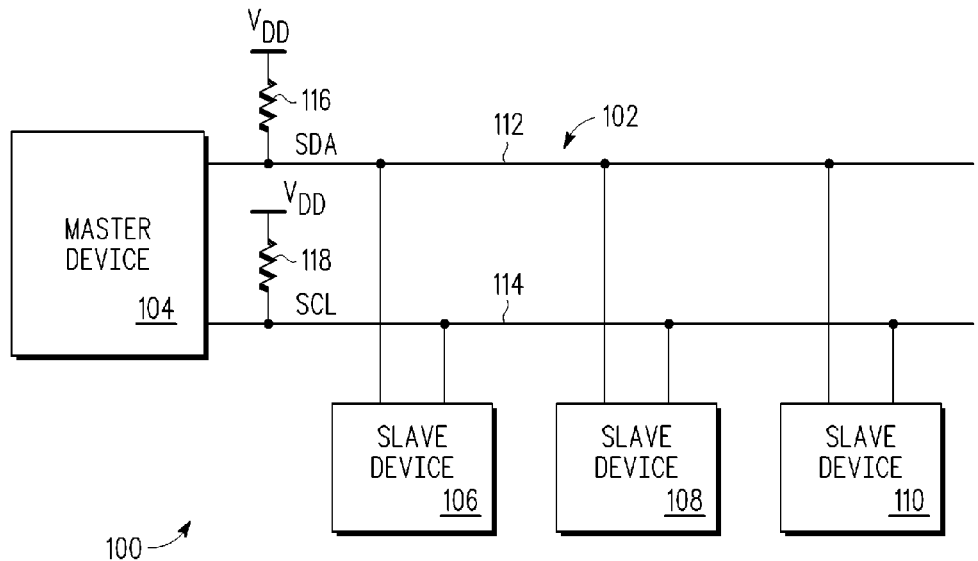
FIG. 1 is a diagram illustrating a multiple-access bus system utilizing data arbitration to determine an extreme value in accordance with at least one embodiment of the present disclosure.

FIG. 1 illustrates a multiple-access bus system 100 in accordance with at least one embodiment of the present disclosure. The multiple-access bus system 100 includes a plurality of devices coupled via a multiple-access bus 102. In the illustrated example, the plurality of devices can include a master device 104 and a plurality of slave devices, such as three slave devices 106, 108, and 110 (collectively, "slave devices 106-110"). In one embodiment, the designations of "master" and "slave" are specific to the bus transaction being processed. That is, in some implementations any of the devices may initiate a bus transaction and thus act as the master device for that bus transaction, while the other devices act as slave devices for the bus transaction.

The multiple-access bus 102 includes a data line and a clock line, whereby the data line and the clock line can be implemented as PCB traces, a twisted-pair, a wire ribbon, and the like. For ease of discussion, the multiple-access bus 102 is described in the context of an I2C-compatible bus, and in this context the data line represents a Serial Data (SDA) line 112 of the I2C-compatible bus and the clock line represents the Serial Clock (SCL) line 114 of the I2C-compatible bus.

In the depicted example, the multiple-access bus 102 has a open-drain configuration with a pull-up resistor 116 to pull the SDA line 112 to a $V_{DD}$ voltage reference and a pull-up resistor 118 to pull the SCL line 114 to the $V_{DD}$ voltage reference, and whereby devices 104, 106, 108, and 110 are connected to the SDA line 112 and the SCL line 114 via pull-down transistors (not shown) in an open-drain or open-collector configuration such that any of the devices 104, 106, 108, and 110 can pull the corresponding line to a low voltage reference (e.g., 0V or GND) due to the resulting wired-AND configuration. The pull-up resistors 116 and 118 can be implemented internal or external to the master device 104.

In at least one embodiment, each of the slave devices 106-110 is associated with a corresponding device-specific address (or other identifier). Further, each of the slave devices 106-110 can be associated with one or more group addresses corresponding to a particular data class available from the slave device. To illustrate, assume that there are two data classes, a voltage data class associated with a group address A and a temperature data class associated with a group address B, and the slave device 106 is configured to provide both temperature data and voltage data, the slave device 108 is configured to provide temperature data, and the slave device 110 is configured to provide voltage data. In this example, the slave devices 106 and 108 are associated with the group address A and the slave devices 106 and 110 are associated with the group address B. Accordingly, a bus transaction addressed to group address A would be processed by slave devices 106 and 108 and a bus transaction addressed to group address B would be processed by slave devices 106 and 110.

In operation, the multiple-access bus system 100 can conduct conventional bus transactions in accordance with the I2C protocol or other communication protocol as appropriate. In this conventional mode, the master device 104 initiates a bus transaction directed to a specific slave device by providing a device-specific address in the corresponding address field. As a result of this device-specific address, only the specified slave device takes action in response to a non-arbitration data field of the bus transaction. Further, in at least one embodiment, the multiple-access bus system 100 can operate in an arbitration mode so as to conduct arbitration bus transactions. In the arbitration mode, a request to obtain data can be directed to multiple slave devices by providing the appropriate group address (or other group identifier) in an address field of an arbitration bus transaction. In response, each of at least a subset of the slave devices 106-110 accesses a stored data value associated with a data class that is identified from the group address and begins to serially transmit the accessed data value (most significant bit first) via the SDA line 112 at the corresponding data field of the arbitration bus transaction. As each bit value is output by a slave device, the slave device checks the state of the SDA line 112 to verify whether the state of the SDA line 112 (i.e., the bit value on the SDA line 112) matches the bit value being output. In the event of a match, the slave device continues on to the next bit of the data value. Otherwise, if the bit value being output does not match the state of the SDA line 112, the slave device ceases transmission for the remainder of the corresponding data field of the arbitration bus transaction. As a result of the active-high logic configuration and the wired-AND configuration of the slave devices 106-110 and the SCL line 112, the resulting data value for the corresponding data field will be the minimum value of the data values from the multiple slave devices. Alternately, the slave devices 106-110 can invert their data values during arbitration so that resulting data value for the corresponding data field is the maximum value of the data values (after being inverted back by the master device 104). In a similar manner, a maximum value of the data values from the multiple slave devices can be arbitrated on the multiple-access bus 102 for an implementation with an active-low logic configuration and a wired-OR configuration.

Table 1 below illustrates an example of the data arbitration scheme employed by the multiple-access bus system 100 for an arbitration bus transaction. For Table 1, it is assumed that a group address associated with each of the slave devices 106-110 is provided with the arbitration bus transaction and thus each of the slave devices 106-110 accesses its corresponding data value and attempts to serially transmit its accessed data value via the SDA line 112 as described in greater detail herein. The second column of Table 1 contains the data values accessed for each of the slave devices 106-110 and the third column of Table 1 contains the resulting transmission sequence (MSB first) attempted at each corresponding slave device resulting from the bitwise arbitration process. For the transmission sequences, a "*" following a bit value indicates that the corresponding slave device has detected a mismatch between its attempt to output that bit value and the state of the SDA line 112. Similarly, an "X" in a particular bit position indicates that that the corresponding slave device has terminated its output, or prevented its attempt to output, the bit value at the particular bit position to the SDA line 112.

TABLE 1

EXAMPLE DATA ARBITRATION

| | Data Value | Transmission Sequence |
|---|---|---|
| Slave Device 106 | 01001001 | 01*XXXXXX |
| Slave Device 108 | 00000110 | 00000110 |
| Slave Device 110 | 00001100 | 00001*XXX |
| | Result on SDA | 00000110 |

As Table 1 illustrates, the slave device 108 has the minimum value of the three data values accessed by the slave devices 106-110 for output via the multiple-access bus 102. At the first bit position (the bit positions timed via the clock signal provided by the SCL line 114), each of the slave devices 106-110 attempts to output a "0" on the SDA line 112 and thus there is a match for each slave device between the bit value it is trying to output for the first bit position and the state of the SDA line 112 for the first bit position. However, at the second bit position, the slave device 106 attempts to output a "1" on the SDA line 112, but because the slave device 108 (and the slave device 110) is concurrently outputting a "0" and because the slave devices 106-110 are connected to the SDA line 112 in a wired-AND configuration, the state of the SDA line 112 for the second bit position stays at "0". The slave device 106, noting this mismatch between the bit value it is trying to output on the SDA line 112 and the actual state of the SDA line 112, ceases its output of the second bit of its data value as represented as well as terminating provision of the remainder of the bit values for its accessed data value, as represented by the X's at the third, fourth, fifth, sixth, seventh and eighth bit positions of the transmission sequence output by the slave device 106. For the third and fourth bit positions, the slave devices 108 and 110 continue to provide the corresponding bit values for output to the SDA line 112 because they both are providing the same bit values for each of the third and fourth bit positions. However, at the fifth bit position, the slave device 110 attempts to output a "1" to the SDA line 112, whereas the slave device 108 attempts to output a "0" to the SDA line 112. Due to the open-drain configuration, the SDA line 112 is driven to a "0" bit value by the slave device 108 for the fifth bit position. Noting the mismatch between the bit value that it is attempting to output and the actual state of the SDA line 112, the slave device 110 ceases its output of the fifth bit of its data value, as well as terminating provision of the remainder of the bit values for its accessed data value, as represented by the X's at the sixth, seventh and eighth bit positions of the transmission sequence output by the slave device 110. As neither the slave device 106 nor the slave device 110 is attempting to output bit values for the sixth, seventh, and eighth bit positions of the transmission sequence, the slave device 108 is able to output its bit values for these bit positions unimpeded. The resulting transmission sequence observed by the master device 104 via the SDA line 112 for the data field is "00000110," which is the minimum value of the three data values accessed and output by the slave devices 106, 108, and 110. In this manner, the master device 104 can determine the extreme data value of a set of data values represented by the slave deices 106-110 using a single data field of a single bus transaction, thereby increasing operational efficiency and decreasing power consumption compared to conventional techniques which required multiple bus transactions to poll each slave device before an extreme value could be determined.

As described in detail herein, an arbitration bus transaction may have more than one arbitration data field. In this instance, the arbitration for each arbitration data field can begin anew. As also described herein, this arbitration process also can be used for an arbitrated device identifier (ID) field (e.g., an address field) of the arbitration bus transaction so as to identify the slave device that provided the extreme value. Multiple arbitrated identifier fields can be implemented in the event that more than one slave device provided the extreme value.

Figure 2:
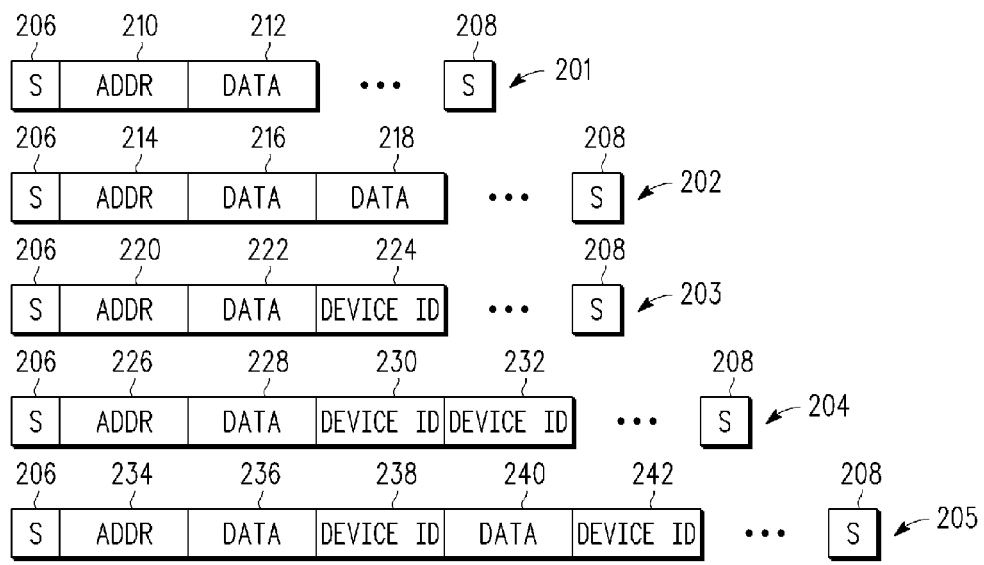
FIG. 2 is a diagram illustrating various example arbitration bus transaction formats for the multiple-access bus system of FIG. 1 in accordance with at least one embodiment of the present disclosure.

FIG. 2 illustrates various arbitration bus transaction formats 201-205 in accordance with at least one embodiment of the present disclosure. Each of the arbitration bus transaction formats 201-205 includes a start indicator 206 (e.g., a start bit) and a termination indicator 208 (e.g., a stop bit) that identify the start and end of a bus transaction.

The arbitration bus transaction format 201 includes an address field 210 used by the master device 104 to provide a group address associated with a particular data class and an arbitration data field 212 used by the slave devices associated with the group address to arbitrate an extreme data value for the corresponding data class using the techniques described herein.

In certain instances, a data class may have a number of sub-classes, and so the master device 104 may desire to determine the extreme data value for each sub-class from the slave devices 106-110. Accordingly, the arbitration bus transaction format 202 includes an address field 214 used by the master device 104 to provide a group address associated with a particular data class having multiple subclasses and a series of two or more arbitration data fields (e.g., arbitration data fields 216 and 218) via which the slave devices can arbitrate the extreme values for corresponding sub-classes. As described in detail herein, the arbitration process can be reinitiated for each data field.

It also may be desirable to identify the slave device that provided the extreme value for an arbitration data field. Accordingly, the arbitration bus transaction format 203 includes an address field 220 used by the master device 104 to provide a group address associated with a particular data class, an arbitration data field 222 that the slave devices associated with the group address can use to arbitrate an extreme data value for the corresponding data class, and a device ID field 224 that can be used to provide a device ID (e.g., a device specific address) of the device that provided the extreme value arbitrated in the preceding arbitration data field 222.

In certain instances, more than one slave device may have provided the extreme value for an arbitration data field. Accordingly, the arbitration bus transaction format 204 includes an address field 226 used by the master device 104 to provide a group address associated with a particular data class, an arbitration data field 228 that the slave devices associated with the group address can use to arbitrate an extreme data value for the corresponding data class, and a sequence of two or more device ID fields (e.g., device ID fields 230 and 323) that can be used to provide device IDs of two or more devices that provided the extreme value arbitrated in the preceding data field 228. As described in detail herein, the device ID fields can be arbitrated in the same manner as the arbitration data fields such that the lowest device ID (or alternately the highest device ID) of the devices providing the lowest data value in the arbitration data field 228 is provided in the device ID field 230, the second lowest device ID of the devices providing the lowest data value is provided in the device ID field 232, and so forth.

The arbitration bus transaction format 205 illustrates a combination of the arbitration bus transaction format 202 and the arbitration bus transaction 203. As such, the arbitration bus transaction format 205 includes an address field 234 to provide a group address associated with a particular data class having multiple subclasses and a series of two or more data fields (e.g., data fields 236 and 240) via which the slave devices can arbitrate the extreme values for corresponding sub-classes. The arbitration bus transaction format 205 further includes one or more device ID fields (e.g., device ID fields 238 and 242) that can be used to provide the device IDs of one or more devices that provided the extreme value arbitrated in the preceding arbitration data field.

Although FIG. 2 illustrates various example arbitration bus transaction formats, other formats or combinations thereof may be utilized without departing from the scope of the present disclosure. Further, certain protocol-specific fields are omitted from the illustrated bus transaction formats for clarity purposes. To illustrate, consistent with the I2C protocol, the arbitration bus transaction formats also can include acknowledge bit fields, read/write bit fields, command fields (for registered modes), and the like.

Figure 3:
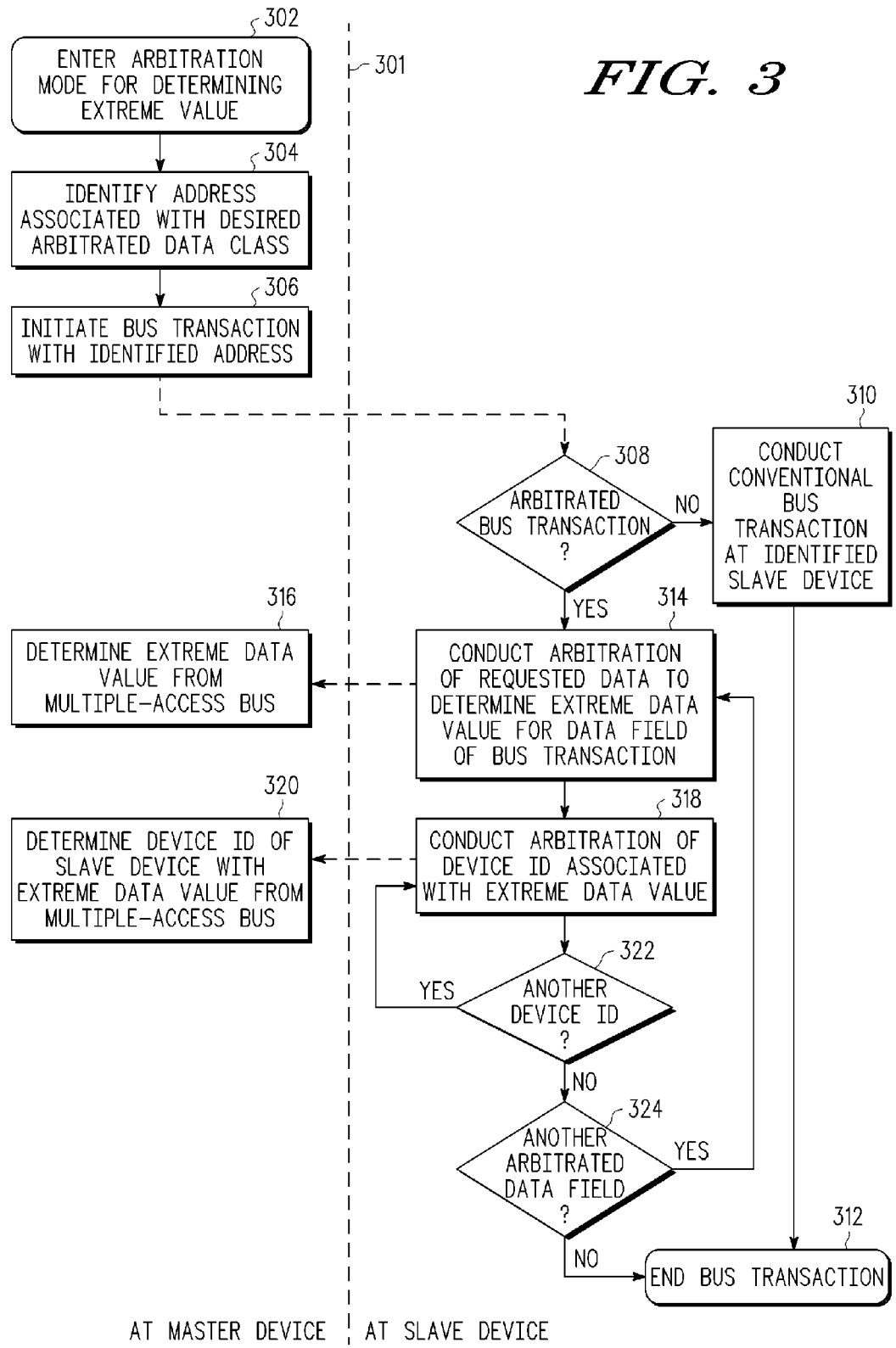
FIG. 3 is a flow diagram illustrating an example operation of the multiple-access bus system of FIG. 1 in accordance with at least one embodiment of the present disclosure.

FIG. 3 illustrates an example method 300 of operation of the multiple-access bus system 100 of FIG. 1 in accordance with at least one embodiment of the present disclosure. In the illustrated example, processes represented by blocks to the left of dotted line 301 represent processes performed at the master device 104 and processes represented by blocks to the right of the dotted line 301 represent processes performed at the slave devices 106-110.

At block 302, the master device 104 enters an arbitration mode to determine an extreme value of the data values stored at the slave devices 106-110 for one or more data class or sub-classes. To illustrate, the slave devices 106-110 each could include, or have access to, a corresponding temperature sensor and the master device 104 may be configured to determine the minimum temperature value from all of temperature sensors. Accordingly, at block 304 the master device 104 identifies a group address or other identifier associated with the particular data class (e.g., a temperature data class). In certain instances, a number of different data classes may be implemented by the multiple-access bus system 100. To illustrate, the multiple-access bus system 100 could implement a temperature data class and a voltage level class, whereby some of the slave devices are configured to determine and provide temperature data and some of the slave devices are configured to determine and provide voltage data. Further, some of the slave devices can be configured to determine and provide both temperature data and voltage data. Accordingly, the master device 104 can select the appropriate group address associated with the desired data class from a list of group addresses based on the desired data class. Alternately, the group address can be supplied to the master device 104 via a value passed through execution of one or more instructions, via signaling provided by another device, via a value stored in memory, a register, or other storage element, and the like.

At block 306, the master device 104 initiates a bus transaction on the multiple-access bus 102, whereby the bus transaction includes the group address in the appropriate address field. To illustrate, in typical I2C implementations, a master device initiates a bus transaction with a start bit, which is then followed with the seven-bit address of the slave device for which the bus transaction is intended. The bus transaction further can include a series of one or more command fields (indicating the action to be taken by the slave devices pursuant to the bus transaction), one or more data fields (which can be used by the master device 104 to transmit data to a slave device for a write transaction or which can be used by the slave devices to transmit data to the master device 104 for a read transaction), and the like. In this example, the master device 104 provides the group address following the start bit so as to signal that the bus transaction is an arbitration bus transaction intended for the slave devices associated with the group address.

At block 308, the slave devices 106-108 recognize that a bus transaction has been initiated by the master device 104 (e.g., in response to the start bit). Because the multiple-access bus system 100, in one embodiment, implements both conventional bus transactions and arbitration bus transactions, at block 308 the slave devices 106-108 each determine whether the initiated bus transaction is a conventional bus transaction (i.e., a read transaction having a non-arbitration data field directed to a particular slave device or a write transaction directed to one or more slave devices) or an arbitration bus transaction (i.e., a read transaction directed to a set of slave devices and having one or more arbitration data fields). As discussed above, the address value in the address field of the bus transaction can identify whether the bus transaction is a conventional bus transaction or an arbitration bus transaction. In the event that the address in the address field is a device-specific address (or the bus transaction is a write transaction), the slave devices 106-108 process the bus transaction as a conventional bus transaction at block 310 until the master device 104 terminates the bus transaction at block 312 (e.g., via transmission of a stop bit). Typically, the slave device associated with the device-specific address processes the command identified by the bus transaction (e.g., by serially transmitting data in a corresponding non-arbitration data field without monitoring the state of the SDA line 112 while transmitting) and the other slave devices disregard the command.

Otherwise, if the address of the bus transaction is a group address that identifies the bus transaction as an arbitration bus transaction directed to a set of the slave devices, at block 314 those slave devices associated with the group address conduct an arbitration for a corresponding data field of the bus transaction. As described in greater detail with reference to FIG. 7, for the arbitration process of an arbitrated field, each slave device attempts to provide the bits of its data value for the corresponding data class (or sub-class) for sequential output (MSB first) to the SDA line 112 unless the slave device determines that the bit value the slave device is attempting to provide for output does not match the state of the SDA line 112. Upon detecting this mismatch, the slave device ceases its attempt to output its data value for the arbitration data field of the bus transaction. As a result, the minimum data value output by the slave devices of the set is transmitted to the master device 104 in the arbitration data field. Accordingly, at block 316 the master device 104 determines the data value supplied in the arbitration data field as the minimum data value and processes the data value accordingly.

As described above with reference to arbitration bus transaction formats 203-205 (FIG. 2), the arbitration bus transaction can include one or more device ID fields so as to identify the one or more devices that provided the minimum value in the preceding arbitration data field. As more than one device may have provided the minimum value, at block 318 the devices that provided the minimum value arbitrate their device ID in the corresponding device ID field in the same manner in which the data values were arbitrated for the arbitration data field. Accordingly, in the first device ID field following an arbitration data field, the lowest device ID is provided, and in the next device ID field, the second lowest device ID is provided, and so on. At block 320 the master device 104 identifies the device ID of a device that provided the extreme value via the device ID field of the bus transaction and processes the device ID accordingly. In the event that more than one slave device provided the extreme value (as determined at block 322), the process of arbitrating the next device ID repeats at blocks 318, 320, and 322 until the device ID of each of the slave devices that provided the extreme data value has been provided to the master device 104.

At block 324, each slave device of the set associated with the group address determines whether there is another arbitration data field in the bus transaction. This determination can be made based on, for example, identifying the group address as being associated with a data class having multiple sub-classes (as described above with reference to the arbitration bus transaction formats 202 and 205, FIG. 2). Alternately, this determination can be made based on the non-presence of a stop bit following the first arbitration data field. In the event that another arbitration data field remains to be processed in the bus transaction, the method 300 returns to block 314 and the slave devices of the set can arbitrate the next data value on the multiple-access bus 102. Otherwise, the arbitration bus transaction terminates at block 312 (e.g., via transmission of a stop bit by the master device 104).

Figure 4:
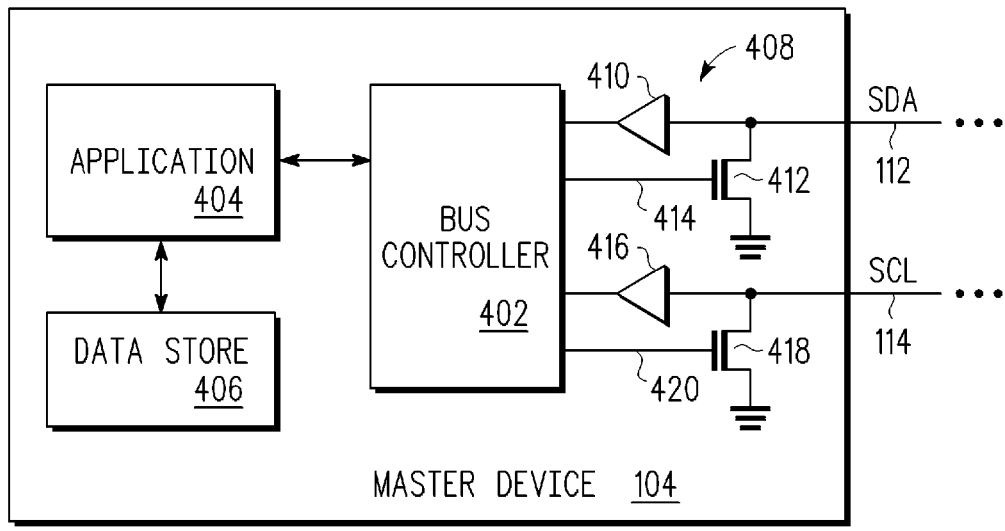
FIG. 4 is a diagram illustrating an example implementation of a master device of the multiple-access bus system of FIG. 1 in accordance with at least one embodiment of the present disclosure.

FIG. 4 illustrates an example implementation of the master device 104 in accordance with at least one embodiment of the present disclosure. The master device 104 includes a bus controller 402, an application 404, a data store 406, and a bus interface 408. The bus interface 408 includes, for example, an input buffer 410 and a pull-down transistor 412 for the SDA line 112 and an input buffer 416 and a pull-down transistor 418 for the SCL line 114, whereby the pull-down transistors 412 and 418 are controlled by the bus controller 402 via control signals 414 and 420, respectively. In at least one embodiment, the bus controller 402 is configured to transmit and receive signaling via the SDA line 112 and the SCL line 114 in accordance with the I2C protocol (or other bus protocol). The application 404 can include software, hardware, firmware, or a combination thereof. The data store 406 includes a register file, memory, or other storage component to store device-specific addresses and group addresses associated with the slave devices 106-110 (FIG. 1), as well as to store data values received from the slave devices 106-110.

In operation, the application 404 identifies data to be requested from one or more of the slave devices 106-110 or data to be provided for storage at one or more of the slave devices 106-110. In the event that the data is needed from only a specific slave device or data is to be written to only a specific slave device, the application 404 accesses the device-specific address of the slave device and provides it to the bus controller 402, along with any other related information, such as command type, a read indicator or write indicator, etc. The bus controller 402 in turn initiates a bus transaction with the device-specific address to obtain the requested data from the specified slave device or to provide data to the specified slave device. Data obtained from a slave device is then provided to the application 404 for processing.

Alternately, in the event that the application 404 needs to determine an extreme data value (e.g., a minimum value in this example) for a data class from the slave devices 106-110, the application 404 accesses a group address associated with the data class from the data store 406 and provides it to the bus controller 402. The bus controller 402 in turn initiates an arbitration bus transaction with the set of slave devices associated with the group address. The slave devices of the set then arbitrate their corresponding data values in a corresponding arbitration data field of the arbitration bus transaction as described herein such that the minimum data value of the data values output by the slave devices is received by the bus controller 402 via the SDA line 112 for the arbitration data field. The bus controller 402 then provides this received data value as a minimum data value to the application 404 for processing.

Figure 5:
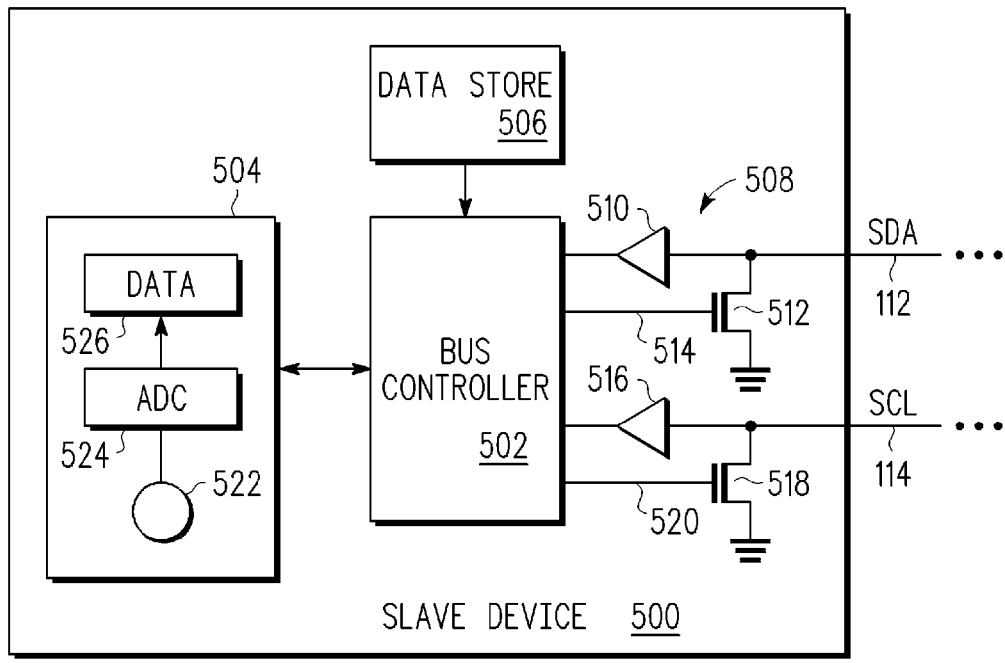
FIG. 5 is a diagram illustrating an example implementation of a slave device of the multiple-access bus system of FIG. 1 in accordance with at least one embodiment of the present disclosure.

FIG. 5 illustrates an example implementation of a slave device 500, corresponding to slave devices 106-110 (FIG. 1), in accordance with at least one embodiment of the present disclosure. In the depicted example, the slave device 500 includes a bus controller 502, a data source 504, a data store 506, and a bus interface 508. The bus interface 508 includes, for example, an input buffer 510 and a pull-down transistor 512 for the SDA line 112 and an input buffer 516 and a pull-down transistor 518 for the SCL line 114, whereby the pull-down transistors 512 and 518 are controlled by the bus controller 502 via control signals 514 and 520, respectively. In at least one embodiment, the bus controller 502 is configured to transmit and receive signaling via the SDA line 112 and the SCL line 114 in accordance with the I2C protocol (or other bus protocol).

The data source 504 includes any of a variety of components to provide data associated with one or more data classes. To illustrate, in one embodiment the data source 504 includes a sensor 522 to provide a sensor output representative of a sensed parameter (e.g., temperature, pressure, voltage, current, etc.), an analog-to-digital (ADC) converter 524 to convert the sensor output to a digital value, and a data register 526 to store the digital value (where the data register 526 can be part of, or separate from, the data store 506). The data store 506 can include data values obtained from the data source 504, a device-specific address for the slave device 500, and one or more group addresses for data classes associated with the slave device 500.

In operation, the bus controller 502 identifies bus transactions that have been initiated by a master device and responds to those bus transactions directed to the slave device 500. To illustrate, the bus controller 502 can compare the address provided in an address field of an initiated bus transaction with addresses stored in the data store 506 to determine whether the bus transaction is specifically directed to the slave device 500 or directed to the slave device 500 as part of a group of slave devices associated with a group address. In the event that the bus transaction is directed specifically to the slave device 500, the bus controller 502 processes the bus transaction, such as by outputting requested data from the data store 506 to the multiple-access bus 102 without data arbitration for a read bus transaction or by storing data provided by the master device 104 in the data store 506 for a write bus transaction.

Otherwise, if the bus controller 502 identifies the bus transaction as an arbitration bus transaction for a particular data class (e.g., the bus transaction includes a group address associated with the data class), the bus controller 502 accesses the data value associated with the data class (e.g., the sensor data from the data register 526) and, using the data arbitration techniques described herein, attempts to output the accessed data value onto the SDA line 112 for the corresponding arbitration data field of the bus transaction. In the event that the slave device 500 is successful in completing transmission of the entire data value (i.e., the data value of the slave device 500 is the lowest value output by the slave devices associated with the data class), the bus controller 502 can then attempt to output the device-specific address for the slave device 500 during one or more following device ID fields of the bus transaction using the arbitration techniques described herein.

Figure 6:
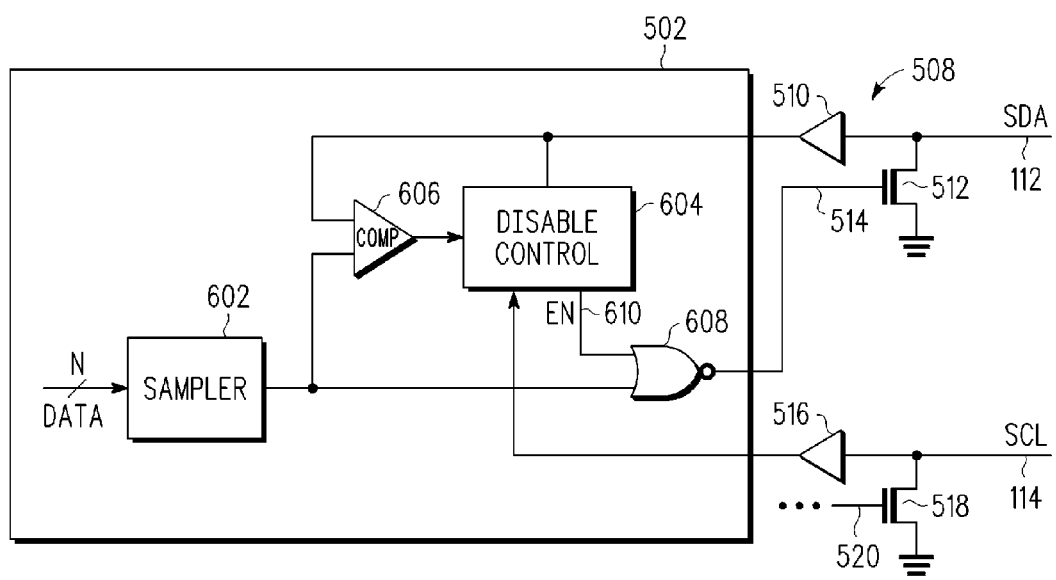
FIG. 6 is a diagram illustrating an example bus controller of the slave device of FIG. 5 in accordance with at least one embodiment of the present disclosure.

FIG. 6 illustrates a particular implementation of the bus controller 502 of the slave device 500 of FIG. 5 as it relates to data arbitration and device ID arbitration in accordance with at least one embodiment of the present disclosure. Control elements used to implement the standard bus protocol signaling, such as start bits, stop bits, acknowledge bits, clock stretching, and the like, are well-known and therefore omitted from the implementation of FIG. 6 for clarity purposes.

In the illustrated example, the bus controller 502 includes a data serializer 602, a disable control module 604, a comparator 606, and a NOR gate 608. The data serializer 602 includes a parallel input to receive a data value having N bits and an output to provide the N bits of the data value in sequence, leading with the most significant bit. The data value can include a data value from the data source 506 (FIG. 5) for output during an arbitration data field, a data value from the data source 506 for output during a non-arbitration data field, a device address value output during a device ID field (arbitrated or non-arbitrated), and the like.

The comparator 606 includes an first input coupled to the output of the data serializer 602, a second input coupled to the SDA line 112 via the input buffer 510 of the bus interface 508, and an output to provide an asserted value (e.g., a logic "1") when the current bit value output by the data serializer 602 matches the logic value on the SDA line 112 and to provide an unasserted value (e.g., a logic "0") when the current bit value and the logic value on the SDA line 112 do not match. In at least one embodiment, the comparator 606 is implemented as an XNOR gate such that when both of the inputs match, the output is asserted and otherwise the output of the XNOR gate is unasserted. Further, it will be appreciated that a delay element (not shown) may be used so as ensure that the comparator 606 does not sample the state of the SDA line 112 to determine whether it matches with a bit value being output to the SDA line 112 until after the output of the bit value to the SDA line 112 has already initiated.

The disable control module 604 includes an input coupled to the SDA line 112 via the input buffer 510, an input coupled to the SCL line 114 via the input buffer 516, an input coupled to the output of the comparator 606, and an output to provide an enable (EN) signal 610. The NOR gate 608 includes a first input to receiver the EN signal 610, a second input coupled to the output of the data serializer 602, and an output to provide the control signal 514 for controlling the pull-down transistor 514. When the EN signal 610 is unasserted, the NOR gate 608 acts as an inverter for the bit value being output by the data serializer 602 and when the EN signal 610 is asserted, the NOR gate 608 outputs a "0" regardless of the bit value output by the bit value 602. Thus, if the bit value output by the data serializer 602 is a "1" and the EN signal 610 is unasserted, the output of the NOR gate 608 is "0," which prevents the pull-down transistor 512 from pulling the SDA line 112 to "0" (or GND). Conversely, if the bit value output by the data serializer 602 is a "0" and the EN signal 610 is unasserted, the output of the NOR gate 608 is "1", which causes the pull-down transistor 512 to pull the SDA line 112 to "0" (or GND). If the EN signal 610 is asserted, the output of the NOR gate 608 is "0" regardless of the bit value, thereby preventing the pull-down transistor from pulling the SDA line 112 to "0". Thus, in response to a mismatch detected via the output of the comparator 606, the disable control module 604 can use the EN signal 610 to terminate the output of a bit value by asserting the EN signal 610 or to allow the output of a bit value by refraining from asserting the EN signal 610.

In one embodiment, the disable control module 604 operates in an arbitration mode and a non-arbitration mode. The disable control module 604 monitors the SDA line 112 (using the clock signal provided via the SCL line 114) to identify whether a bus transaction has been initiated. If so, the disable control module 604 determines whether the bus transaction is a conventional bus transaction or an arbitration bus transaction. If it is a conventional bus transaction, the disable control module 604 enters the non-arbitration mode, disregards the output of the comparator 606 (i.e., ceases to monitor whether the state of the SDA line 112 matches the bit value output to the SDA line 112) and maintains the EN signal 610 in an unasserted state, thereby allowing the bit value output by the data serializer 602 to be output to the SDA line 112 via the NOR gate 608 and the pull-down transistor 512 (and subject to the bus protocol requirements). Otherwise, if it is an arbitration bus transaction, the disable control module 604 enters the arbitration mode.

In the arbitration mode, the disable control module 604 initially maintains the EN signal 610 in an unasserted state and monitors the multiple-access bus 112 to identify the start of an arbitration data field or an arbitration device ID field. In response to identifying the start of an arbitration data field or an arbitration device ID field, the disable control module 604 monitors the output of the comparator 606 to determine whether the bit value being output to the SDA line 112 matches the state of the SDA line 112. In response to the comparator 606 asserting its output, thereby indicating a mismatch, the disable control module 604 asserts the EN signal 610 until the end of the arbitration data field or arbitration device ID field (e.g., via a D flip flop), thereby effectively preventing the pull-down transistor 514 from pulling the SDA line 112 to "0" for the remainder of the arbitration data field or device ID field. At the end of the arbitration data field/ device ID field, the disable control module 604 resets itself and reconfigures the EN signal 610 to the unasserted state (e.g., via a set/reset flip flop connected to the input of the D flip flop). The process then may be repeated for the next arbitrated data/device ID field, or if the bus transaction has ended, the disable control module 604 may be reconfigured from the arbitration mode to the non-arbitration mode in anticipation of the next bus transaction.

Figure 7:
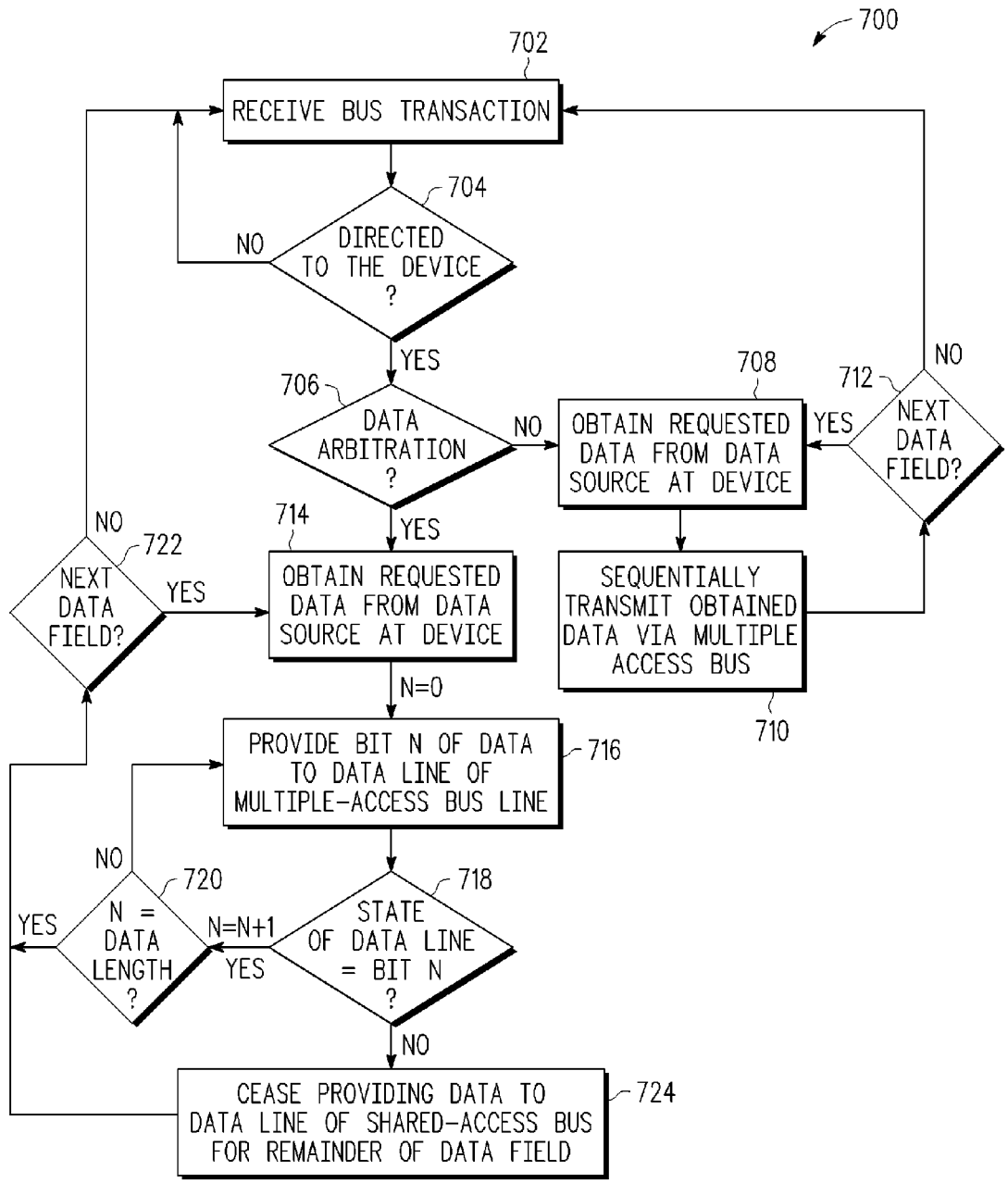
FIG. 7 is a flow diagram illustrating an example operation of the slave device of FIG. 5 for data arbitration in accordance with at least one embodiment of the present disclosure.

FIG. 7 illustrates an example method 700 of operation of a slave device in accordance with at least one embodiment of the present disclosure. For ease of illustration, the method 700 is described in the example context of the slave device 500 of FIG. 5.

At block 702, the master device 104 initiates a bus transaction, which is identified as being initiated at the slave device 500. At block 704, the slave device 500 determines whether the bus transaction includes a read request directed to the slave device 500, either specifically or as one of a group. As described above, the intended recipients of the bus transaction can be identified via, for example, the address in an address field of the bus transaction. In the event that the bus transaction is not directed to the slave device 500, the slave device 500 disregards the bus transaction and the method 700 returns to block 702 for the next bus transaction.

Otherwise, at block 706 the slave device 500 determines whether the bus transaction includes a conventional read request or includes an arbitrated read request based on, for example, whether the address of the bus transaction is a device-specific address or a group address. In the event that the bus transaction is a conventional read request, the slave device 500 obtains the requested data from the data source 506 at block 708 and at block 710 the slave device 500 sequentially transmits the bit values of the requested data to the master device 104 via the multiple-access bus during the corresponding non-arbitration data field without monitoring the SDA line 112 to make sure the state of the SDA line 112 matches the bit output to the SDA line 112. In certain instances, more than one data field of the bus transaction may be needed to transmit the requested data, so at block 712 the slave device 500 determines whether another data field is needed to transmit more of the requested data, and if so, the processes of blocks 708 and 710 are repeated for the next segment of the requested data.

In the event that the bus transaction is identified as an arbitration bus transaction at block 706, the method 700 continues to block 714, wherein the slave device 500 accesses the requested data value from the data source 506. At block 716, the slave device 600 provides the most significant bit of the data value for output to the SDA line 112. At block 718, the slave device 500 determines whether the state of the SDA line 112 is the same as the bit value being provided for output to the SDA line 112 by the slave device 500.

If there is a match between the bit value being output and the state of the SDA line 112, the slave device 500 determines whether every bit of the data value has been provided for output to the SDA line 112 at block 720. If not, the processes of blocks 716, 718, and 720 are repeated for the second most significant bit, and so on. If all of the bits of the data value have been provided for output the slave device 500 identifies itself as having provided the extreme value for the arbitration data field. Further, at block 722 the slave device 500 determines whether there is another arbitration data field (e.g., for a separate data sub-class) or an arbitration device ID field to identify the slave device or devices that provided the extreme value. If not, the method 700 returns to block 702 for the next bus transaction. Otherwise, if there is another arbitration data field in which the slave device 500 is to participate, the method 700 returns to block 714 for processing the next data value for the next arbitration data field of the bus transaction. If there is an arbitration device ID field and the slave device 500 identified itself as having provided the extreme data value, the slave device 500 can arbitrate its device-specific address for the arbitration device ID field in a similar manner.

If there is a mismatch between the bit value being output and the state of the SDA line 112 at block 718, at block 724 the slave device 500 ceases its sequential output of the bits of the data value for the remainder of the arbitration data field. The method 700 then flows to block 722 so as to determine whether there is another arbitration data field in the bus transaction. At the end of the arbitration data field, the master device 104 may identify the data value observed via the SDA line 112 as the extreme data value of the slave devices for the arbitration data field and process the data value accordingly.

Figure 8:
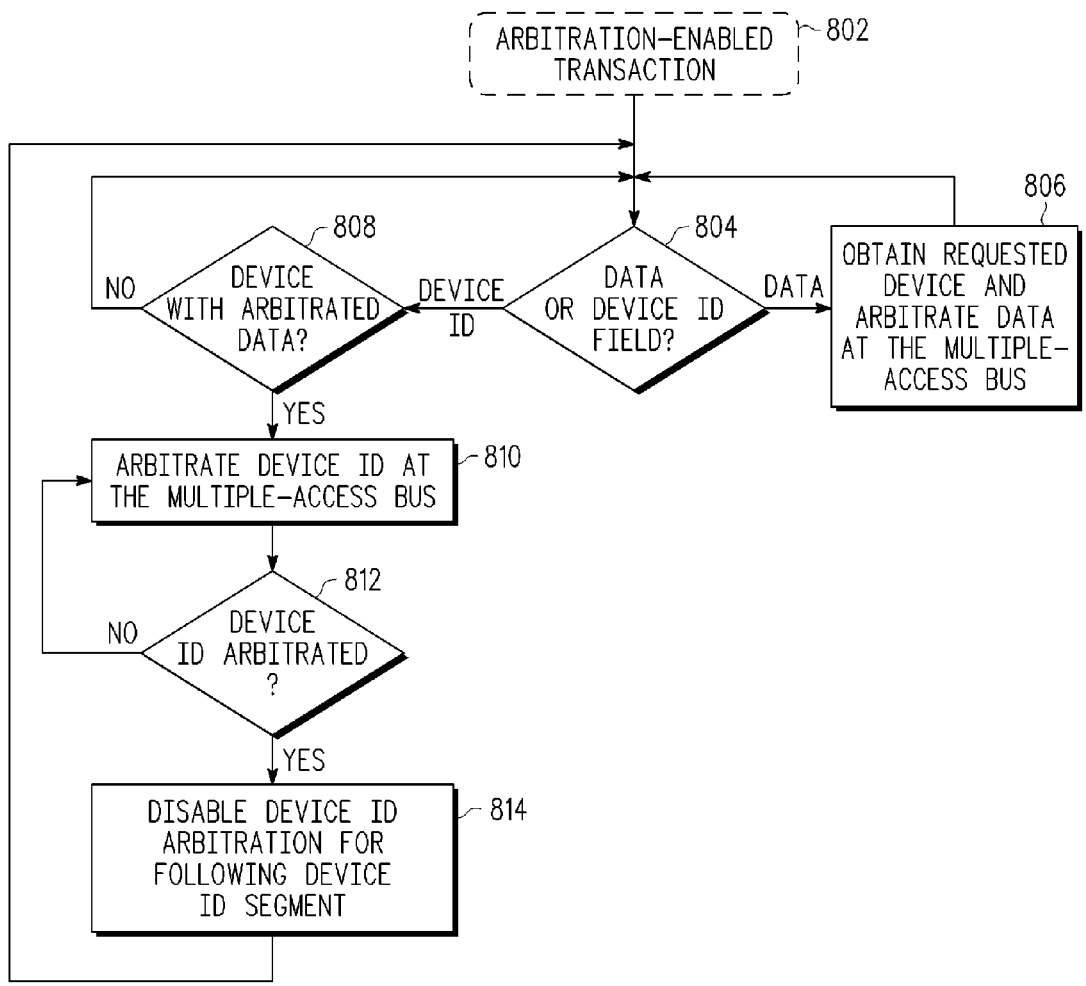
FIG. 8 is a flow diagram illustrating an example operation of the slave device of FIG. 5 for device ID arbitration of a slave device providing the extreme value of a data class in accordance with at least one embodiment of the present disclosure.

FIG. 8 illustrates an example method 800 for arbitrating an extreme data value during an arbitration data field and arbitrating the device ID of the one or more slave devices that provided the extreme data value in accordance with at least one embodiment of the present disclosure. For ease of illustration, the method 800 is described in the example context of the slave device 500 of FIG. 5.

At block 802, the slave device 500 identifies that the master device 104 has initiated an arbitration bus transaction directed at the slave device 500 as described above with reference to the method 700 of FIG. 7. At the initiation of an arbitrated field of the arbitration bus transaction, the slave device 500 determines whether the arbitrated field is an arbitration data field or an arbitration device ID field at block 804. In the event that it is an arbitration data field, at block 806 the slave device 500 accesses its data value associated with the arbitration data field and then arbitrates its data value with the other slave devices during the arbitration data field as described in greater detail above. The method 800 then returns to block 804 for the next field of the arbitration bus transaction.

In the event that the slave device 500 identifies the field of the arbitration bus transaction as an arbitration device ID field, at block 808 the slave device 800 determines whether it provided the extreme data value that was arbitrated at block 806 for the preceding arbitration data field. If not, the method 800 returns to block 804 for the next field of the arbitration bus transaction. Otherwise, if the slave device 500 is one of the one or more slave devices that provided the extreme data value for the preceding arbitration data field, at block 810 the slave device 500 arbitrates its device ID during the device ID field using the same arbitration technique for data values. At block 812, the slave device 500 determines whether its device ID was the arbitrated device ID for the device ID field (i.e., the device ID of the slave device 500 was successfully output in its entirety to the master device 104 via the multiple-access bus 102). If not, the slave device 500 again attempts to arbitrate its device ID for the next arbitration device ID field, and so on, until the slave device 104 successfully arbitrates its device ID, at which point the slave device 500 disables any further device ID arbitration at block 814 and the method 800 returns to block 804 for the next field of the bus transaction.

Figure 9:
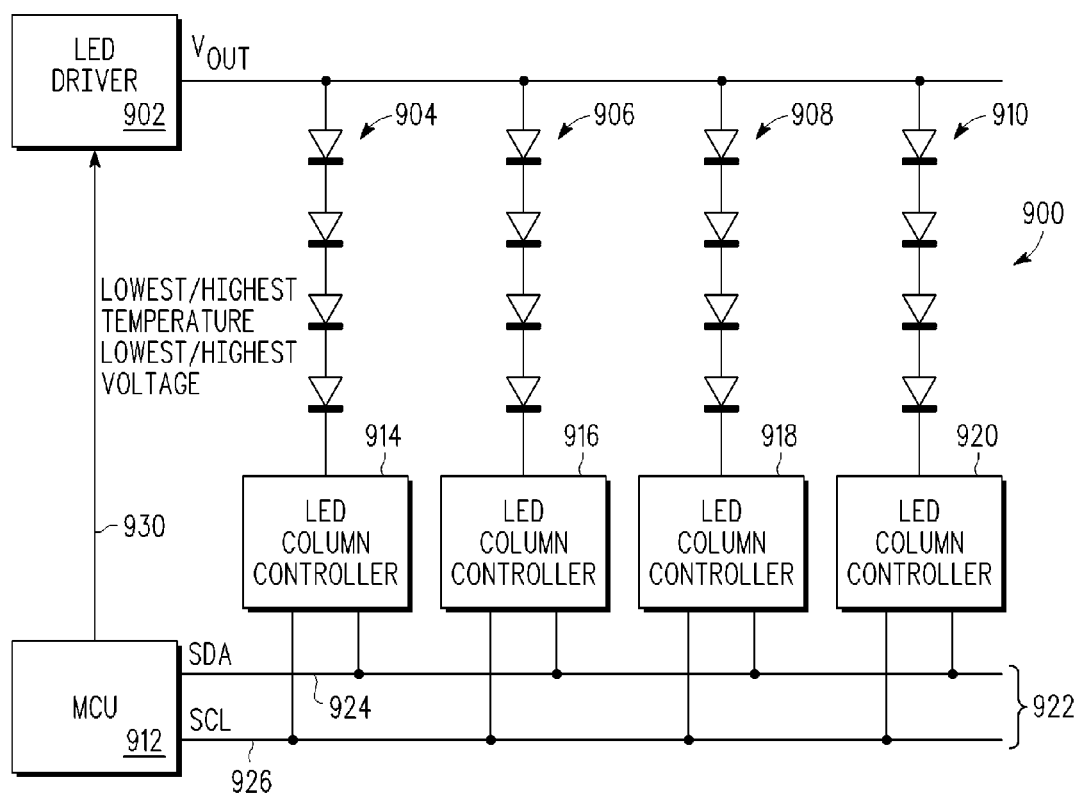
FIG. 9 is a diagram illustrating an example implementation of the multiple-access bus system of FIG. 1 in accordance with at least one embodiment of the present disclosure.

FIG. 9 illustrates an example system 900 implementing the bus arbitration technique described above so as to determine an extreme value from a plurality of slave devices. In the depicted example, the system 900 comprises a backlighting system for a liquid crystal display (LCD). The system 900 includes a light emitting diode (LED) driver 902 configured to provide a programmable output voltage $V_{out}$, a plurality of LED chains (e.g., LED chains 904, 906, 908, and 910) arranged in columns, a master control unit (MCU) 912, LED column controllers 914, 916, 918, and 920, and an I2C bus 922 having an SDA line 924 and an SCL line 926. The LED chains 904, 906, 908, and 910 comprise a plurality of LEDs connected in series between the voltage output of the LED driver 902 and another voltage reference (e.g., GND). The LED column controllers 914, 916, 918, and 920 are configured to monitor one or parameters of a corresponding one of the LED chains 904, 906, 908 and 910, such as a voltage, current or temperature detected at the corresponding LED chain. The LED column controllers 914, 916, 918 and 920 are connected to the MCU 912 via the I2C bus 922.

In at least one embodiment, the MCU 912 controls the voltage Vout output by the LED driver 902 based on a maximum or minimum voltage or a maximum or minimum temperature detected at the LED chains 904, 906, 908, and 910. Rather than poll each LED column controller to determine the voltage value or temperature for each LED chain and then determine the minimum or maximum value from the individually polled values, in at least one embodiment the MCU 912 is configured to initiate an arbitration bus transaction so as to direct the LED column controllers 914, 916, 918, and 920 to arbitrate their respective temperature/voltage values during a corresponding arbitration data field of the arbitration bus transaction using the techniques described above. The resulting data value output over the I2C bus 922 during the arbitration data field represents the maximum (or minimum) temperature/voltage value. The LED column controllers 914, 916, 918, and 920 further can be configured to arbitrate their device IDs as described above so that the MCU 912 can identify the one or more LED column controllers that provided the maximum (or minimum) temperature/voltage value. The MCU 912 then can use the identified maximum (or minimum) value to adjust the voltage Vout provided by the LED driver 902.

In accordance with one aspect of the present disclosure, a system comprises a plurality of devices coupled via a multiple-access bus. The plurality of devices includes a master device and a plurality of slave devices. The master device is configured to initiate a bus transaction having an arbitration data field for processing by a subset of the slave devices. Each slave device of the subset is configured to arbitrate a corresponding data value for the arbitration data field via the multiple-access bus such that an extreme data value of the data values of the slave devices of the subset is transmitted via the multiple-access bus for the arbitration data field.

In accordance with another aspect of the present disclosure, a method in a system comprising a first device and a second device coupled via a multiple-access bus is provided. The method includes providing, during a first data field of a first bus transaction, a first data value for serial transmission via a data line of the multiple-access bus starting with a most significant bit of the first data value. The method further includes monitoring a state of the data line while providing the first data value and terminating provision of the first data value for the first data field in response to determining that a bit value of the first data value being provided to the data line does not match the state of the data line.

In accordance with yet another aspect of the present disclosure, a method includes initiating, at a master device, a bus transaction for a multiple-access bus coupled to a plurality of slave devices, the bus transaction having an arbitration data field. The method further includes, for each slave device of subset of the plurality of slave devices, providing each bit of a data value accessible to the slave device in series for transmission via a data line of the multiple-access bus starting with the most significant bit of the data value until a state of the data line when a bit is being provided does not correspond to the bit being provided. The method additionally includes storing, at the master device, a sequence of bit values present at the data line during the arbitration data field as an extreme data value of the data values provided by the subset of slave devices.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically. The term "subset," as used herein, is defined as one or more of a larger set, inclusive.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A system comprising:
a plurality of devices coupled via a multiple-access bus, the plurality of devices including a master device and a plurality of slave devices;
the master device configured to initiate a bus transaction having an arbitration data field and a plurality of device identifier fields for processing by a subset of the slave devices; and
each slave device of the subset configured to arbitrate a corresponding data value for the arbitration data field via the multiple-access bus such that an extreme data value of the data values of the slave devices of the subset is transmitted via the multiple-access bus for the arbitration data field; and each slave device of the subset providing the extreme data value is configured to arbitrate a device identifier of the slave device via a corresponding one of the plurality of device identifier fields.

2. The system of claim 1, wherein each slave device of the subset comprises a bus interface coupled to a data line of the multiple-access bus; and a bus controller coupled to the bus interface, the bus controller to:

provide, during the arbitration data field of the arbitration bus transaction, the corresponding data value for serial transmission via the data line starting with a most significant bit of the data value;

monitor a state of the data line while providing the corresponding data value; and terminate provision of the corresponding data value for the arbitration data field in response to determining that a bit value of the corresponding data value being provided to the data line does not match the state of the data line.

3. The system of claim 1, wherein:
each slave device of the subset comprises a sensor; and
the corresponding data value of each slave device of the subset is representative of an output of the sensor of the slave device.

4. The system of claim 1, wherein:
the arbitration data field comprises a first arbitration data field and the bus transaction further comprises a second arbitration data field; and
each slave device of the subset is configured to arbitrate a corresponding data value for the second arbitration data field via the multiple-access bus such that an extreme data value of the data values of the slave devices of the subset is transmitted via the multiple-access bus for the second arbitration data field.

5. The system of claim 1, wherein:
the bus transaction comprises a first bus transaction;
the master device is configured to initiate a second bus transaction having a non-arbitration data field for processing by a specified slave device of the plurality of slave devices; and
the specified slave device is configured to, in response to the second bus transaction, provide a corresponding data value for serial transmission via the data line starting with the most significant bit of the corresponding data value without monitoring a state of the data line while providing the corresponding data value.

6. The system of claim 1, wherein the bus transaction comprises an address field having a group address associated with the subset of the plurality of slave devices.

7. The system of claim 1, wherein the multiple-access bus comprises a two-wire bus having a data line and a clock line.

8. The system of claim 7, wherein the two-wire bus comprises a two-wire bus compatible with one selected from a group consisting of: an Inter-Integrated Circuit (I2C) protocol; a Controller Area Network (CAN) protocol; and a System Management Bus (SMBus) protocol.

9. The system of claim 1, wherein the subset of slave devices comprises a first slave device that provides the extreme data value for the arbitration data field and a second slave device that provides the extreme data value for the arbitration data field, the first slave device having a first device identifier value and the second slave device having a second device identifier value, and wherein:

the first slave device and the second slave device are configured to arbitrate the first device identifier value and the second device identifier value for a first device identifier field of the bus transaction such that an extreme device identifier value of the first and second device identifier values is provided to the master device for the first device identifier field; and the one of the first and second slave devices having a device identifier value other than the extreme device identifier value of the first and second device identifier fields is configured to arbitrate the device identifier value for a second device identifier field of the bus transaction such that the device identifier value is provided to the master device for the second device identifier field, the second device identifier field following the first device identifier field in the bus transaction.

10. In a system comprising a first device and a second device coupled via a multiple-access bus, a method comprising:

in a first mode of the first device:

providing, during a first data field of a first bus transaction, a first data value for serial transmission via a data line of the multiple-access bus starting with a most significant bit of the first data value;

monitoring a state of the data line while providing the first data value;

terminating provision of the first data value for the first data field in response to determining that a bit value of the first data value being provided to the data line does not match the state of the data line;

providing, during a first device identifier (ID) field of the first bus transaction, a device ID value associated with the first device for serial transmission via the data line starting with a most significant bit of the device ID value in response to completing provision of the first data value for transmission during the first data field;

monitoring a state of the data line while providing the device ID value;

terminating provision of the device ID value for the first device ID field in response to determining that a bit value of the device ID value being provided to the data line does not match the state of the data line;

providing, during a second device ID field of the first bus transaction, the device ID value for serial transmission via the data line starting with the most significant bit of the device ID value in response to terminating provision of the device ID value during the first device ID field;

monitoring a state of the data line while providing the device ID value; and terminating provision of the device ID value for the second device ID field in response to determining that a bit value of the device ID value being provided to the data line does not match the state of the data line.

11. The method of claim 10, further comprising:
in the first mode of the first device:

providing, during a second data field of the first bus transaction, a second data value for serial transmission via the data line starting with a most significant bit of the second data value;

monitoring a state of the data line while providing the second data value; and terminating provision of the second data value for the second data field in response to determining that a bit value of the second data value being provided to the data line does not match the state of the data line.

12. The method of claim 10, further comprising:
in a second mode of the first device:
providing, during a data field of a second bus transaction, a second data value for serial transmission via the data line starting with the most significant bit of the second data value without monitoring the state of the data line while providing the second data value.

13. The method of claim 10, wherein the first bus transaction includes an address value at an address field, the address value associated with the first mode, and the method further comprising:
entering the first mode at the first device in response to identifying the address value from the address field of the first bus transaction.

14. The method of claim 10, wherein the first bus transaction comprises an address field having a group address associated with a subset of a plurality of devices of the system, the subset including the first device.

15. The method of claim 10, wherein the multiple-access bus comprises a two-wire bus having the data line and a clock line.

16. A method comprising:
initiating, at a master device, a first bus transaction for a multiple-access bus coupled to a plurality of slave devices, the first bus transaction having an arbitration data field, a first device identifier (ID) field, and a second device ID field, the second device ID field following the first device ID field;
for each slave device of subset of the plurality of slave devices, providing each bit of a data value accessible to the slave device in series for transmission during the arbitration data field via a data line of the multiple-access bus staffing with the most significant bit of the data value until a state of the data line when a bit is being provided does not correspond to the bit being provided;
storing, at the master device, a sequence of bit values present at the data line during the arbitration data field as an extreme data value of the data values provided by the subset of slave devices;
for each device of the subset that provided a data value equal to the extreme data value during the arbitration data field, providing each bit of a device ID value associated with the slave device in series for transmission via the data line of the multiple-access bus starting with the most significant bit of the device ID value for the first device ID field of the first bus transaction until a state of the data line when a bit is being provided by the slave device does not correspond to the bit being provided;
storing, at the master device, a first sequence of bit values present on the data line during the first arbitrated device ID field as a first device ID value of a first slave device that provided the extreme data value during the arbitration data field;
for each device of the subset that provided a data value equal to the extreme data value during the arbitration data field other than the device of the subset that completed provision of the associated device ID value for the first device ID field, providing each bit of the device ID value associated with the slave device in series for transmission via the data line of the multiple-access bus starting with the most significant bit of the device ID value for the second device ID field of the first bus transaction until a state of the data line when a bit is being provided by the slave device does not correspond to the bit being provided; and
storing, at the master device, a second sequence of bit values present on the data line during the second arbitrated device ID field as a second device ID value of a second slave device that provided the extreme data value during the arbitration data field.

17. The method of claim 16, wherein providing each bit of a data value accessible to the slave device in series for transmission comprises accessing the data value from a sensor associated with the slave device.

18. The method of claim 17, wherein accessing the data value from a sensor comprises accessing the data value from one of a group consisting of: a temperature sensor; a voltage sensor; a current sensor; and a pressure sensor.

19. The method of claim 16, further comprising:
initiating, at the master device, a second bus transaction for the multiple-access bus, the second bus transaction including a non-arbitration data field and an address field having an address value associated with a specified slave device of the plurality of slave devices;
in response to the second bus transaction, providing each bit of a data value accessible to the specified slave device in series for transmission via the data line starting with the most significant bit of the data value for the non-arbitration data field without monitoring the state of the data line as the data value is being provided; and
storing, at the master device, a sequence of bit values present at the data line during the non-arbitration data field as a data value provided by the specified slave device.

20. The method of claim 16, wherein the multiple-access bus comprises a two-wire bus having the data line and a clock line.

* * * * *

UNITED STATES PATENT AND TRADEMARK OFFICE
CERTIFICATE OF CORRECTION

| | | |
|---|---|---|
| PATENT NO. | : 7,707,339 B2 | Page 1 of 1 |
| APPLICATION NO. | : 11/959250 | |
| DATED | : April 27, 2010 | |
| INVENTOR(S) | : Pigott et al. | |

It is certified that error appears in the above-identified patent and that said Letters Patent is hereby corrected as shown below:

Col 17, Line 35, delete "staffing" and insert --starting--.

Signed and Sealed this
Tenth Day of April, 2012

David J. Kappos
*Director of the United States Patent and Trademark Office*